(12) United States Patent
Samuelson et al.

(10) Patent No.: US 10,796,592 B2
(45) Date of Patent: Oct. 6, 2020

(54) USER GENERATED CONTENT WITHIN AN ONLINE EDUCATION PLATFORM

(71) Applicant: COURSERA, INC., Mountain View, CA (US)

(72) Inventors: Jacob K. Samuelson, Redwood City, CA (US); Myra Liu, Redwood City, CA (US); Jiquan Ngiam, Mountain View, CA (US); Mustafa Furniturewala, Sunnyvale, CA (US)

(73) Assignee: Coursera, Inc., Mountain View, CA (US)

( * ) Notice: Subject to any disclaimer, the term of this patent is extended or adjusted under 35 U.S.C. 154(b) by 292 days.

(21) Appl. No.: 15/848,902

(22) Filed: Dec. 20, 2017

(65) Prior Publication Data

US 2018/0174476 A1   Jun. 21, 2018

Related U.S. Application Data

(60) Provisional application No. 62/436,637, filed on Dec. 20, 2016.

(51) Int. Cl.
*G09B 7/08* (2006.01)
*G09B 7/07* (2006.01)
(Continued)

(52) U.S. Cl.
CPC ............. *G09B 7/08* (2013.01); *G06F 40/131* (2020.01); *G06F 40/14* (2020.01); *G06F 40/154* (2020.01); *G09B 7/07* (2013.01)

(58) Field of Classification Search
CPC .................................... G09B 7/07; G09B 7/08
See application file for complete search history.

(56) References Cited

U.S. PATENT DOCUMENTS 7,870,481 B1 *  1/2011  Zaud ..................... G06F 16/957
                                                          715/234
10,482,781 B2   11/2019 Aleahmad et al.
(Continued)

FOREIGN PATENT DOCUMENTS

EP       3317827 A1    5/2018
WO    2012068157 A2    5/2012

OTHER PUBLICATIONS

GoConqr.com as evidenced by online tutorial video "How to Create Quizzes with GoConqr" published on Feb. 8, 2016, available online: https://www.youtube.com/watch?v=x9HcvTc-Uto.*

(Continued)

*Primary Examiner* — James S. McClellan
(74) *Attorney, Agent, or Firm* — Brake Hughes Bellermann LLP

(57) ABSTRACT

According to an implementation, a system includes an online education platform including a content manager configured to provide an authoring tool on a computing device associated with a learner of an online course. The authoring tool is configured to provide at least one user interface for creation of a learner-created question for an assessment for the online course. The content manager includes an education content converter configured to convert the learner-created question from a first format to a second format. The online education platform including an assessment bank configured to store the learner-created question, as well as other learner-created questions and instructor-created questions. The online education platform including a content selector configured to select a plurality of questions from the assessment bank for the assessment for the online course.

17 Claims, 7 Drawing Sheets

(51) Int. Cl.
  *G06F 40/14* (2020.01)
  *G06F 40/131* (2020.01)
  *G06F 40/154* (2020.01)

(56) References Cited

U.S. PATENT DOCUMENTS

| | | |
|---|---|---|
| 2001/0056460 A1 | 12/2001 | Sahota et al. |
| 2002/0019837 A1 | 2/2002 | Balnaves et al. |
| 2006/0168233 A1 | 7/2006 | Alcorn et al. |
| 2007/0143664 A1 | 6/2007 | Fang et al. |
| 2009/0226872 A1 | 9/2009 | Gunther |
| 2010/0279264 A1 | 11/2010 | Barazanji |
| 2014/0072945 A1 | 3/2014 | Gu et al. |
| 2014/0335497 A1 | 11/2014 | Gal et al. |
| 2014/0335498 A1 | 11/2014 | Muthukumarasamy et al. |
| 2015/0099255 A1 | 4/2015 | Aslan et al. |
| 2017/0004720 A1 | 1/2017 | Ahuja et al. |
| 2017/0004721 A1 | 1/2017 | Aleahmad et al. |

OTHER PUBLICATIONS

International Search Report and Written Opinion received for PCT Application No. PCT/US2016/039836, dated Nov. 3, 2016, 10 pages.

\* cited by examiner

300

< Back to Review  X Questions

| ✓ 1 | X 2 |
| 3 | 4 |
| 5 | 6 |
| 7 | 8 |
| 9 | 10 |

Shuffle Questions

3. Which of the following are benefits for yourself when you start coaching employees? (select all that apply)

☐ Your job will become harder
☐ You will be able to attract and hire better talent
☒ Communication between manager and employee often improves
☒ You don't need to be as concerned with other aspects of you job Check Answer Created by : Username123

Save

Review related material

I know this

3. Which of the following are benefits for yourself when you start coaching employees? (select all that apply)

☐ Your job will become harder

Un-selected is correct

☐ You will be able to attract and hire better talent

You should have selected this

☒ Communication between manager and employee often improves

Correct
Because coaching helps to strengthen relationships between manager and employee, communication often improves, Did you get the other two on the list as well (your job will become easier; attracting and hiring better talent)?

☒ You don't need to be as concerned with other aspects of your job

You shouldn't have selected this
While this would be nice, it obviously isn't always a given. The correct answers were; your job will become easier, you will be able to attract and hire better talent, and communication often emproves.

Created by : Username123

< Back to Review | ✗ Questions

✓ 1 | ✗ 2 | 3 | 4 | 5 | 6 | 7 | 8 | 9 | 10

Shuffle Questions

| University A |
| --- |
| ⚙ Admin |
| Course Home |
| Grades |
| Review |
| Discussion Forums |
| Resources |
| Course Info |

60% accuracy  4 Correct streak  17 Correct total  [Review Next]

📅 Review By Week

| Week 1 | 40 questions → | | Week 2 | 999 questions → |
|---|---|---|---|---|
| What is Learning? | 12 correct | | Chunking | 0 correct |
| Module 2 name | 5 correct | | | |

| Week 3 | 999 questions → | | Week 2 | 999 questions → |
|---|---|---|---|---|
| Procrastination and Memory | 0 correct | | Renaissance Learning and Unlocking your potential | 0 correct |

🎓 Review By Learning Objectives

| Examine | 40 questions → | | Analyze | 999 questions → |
|---|---|---|---|---|
| Examine pictures of people – as individuals or as representatives of a type | 9 correct | | How artist's exaCurrent methodproduction | *These questions are created by other learners* |

| Discover | 40 questions → |
|---|---|
| How the choices made by both photographer and subject inform your assumptions about those depicted | 4 correct |

*Volunteer to create additional questions*

FIG.3C

USER GENERATED CONTENT WITHIN AN ONLINE EDUCATION PLATFORM

CROSS-REFERENCE TO RELATED APPLICATION

This application is a non-provisional of, and claims priority to, U.S. Patent Application No. 62/436,637, filed on Dec. 20, 2016, entitled "USER GENERATED CONTENT WITHIN AN ONLINE EDUCATION PLATFORM," which is incorporated by reference herein in its entirety.

BACKGROUND

An online education platform provides a system that delivers online courses to learners through network-connected devices. For example, learners may use computing device to view and interact with course materials provided by the online education platform. In some examples, the online education platform may grade an assessment taken by the learners via their devices, and then, based on the results, the instructor may want to modify or change questions and/or answers to make the assessment better. In addition, the learners themselves may have suggestions, proposed changes, and/or sample assessment questions that, if incorporated, could enhance the online course. However, conventional online education platforms are relatively rigid, uniform, and standard, which can make it difficult incorporating changes to the course content provided by the online education platform. For example, the technical knowledge to implement certain changes is often beyond the technical expertise of the learners and/or instructors.

SUMMARY

According to an implementation, a system includes an online education platform configured to provide an online course over a network to a plurality of computing devices, where the online course provides education content in which learners view and interact with the education content. The online education platform includes a content manager configured to provide an authoring tool on a computing device associated with a learner of the online course. The authoring tool is configured to add material to the education content. The authoring tool is configured to provide at least one user interface for creation of a learner-created question for an assessment for the online course. The content manager includes an education content converter configured to receive the learner-created question in a first format and convert the first format to a second format compatible to the online education platform. The online education platform including an assessment bank configured to store the learner-created question. The assessment bank includes learner-created questions and instructor-created questions. The online education platform including a content selector configured to select a plurality of questions from the assessment bank for the assessment for the online course.

According to some implementations, the system may include the following one or more features (or any combination thereof). The learner-created question may be stored in a one-question format. The content selector may be configured to sort the learner-created questions and the instructor-created questions in the assessment back according to quality, and select the plurality of questions based on the sorted list. The at least one user interface provided by the authoring tool may identify at least one text box for describing the learner-created question and one or more text boxes for providing one or more answers to the learner-created question. The first format may be a hypertext markup language (HTML) format. The second format may be an education markup language (EML) format. The EML format may define a plurality of blocks using extensible markup language (XML), where each of the plurality of blocks corresponds to a different type of data content. The XML may define each block of the plurality of blocks with restricted attributes that limits a block to a particular type of data content.

According to an implementation, a non-transitory computer-readable medium storing executable instructions that when executed by at least one processor are configured to implement an online education platform. The online education platform is configured to provide an online course over a network to a plurality of computing devices. The online course provides education content in which learners view and interact with the education content. The online education platform is configured to provide an authoring tool on a computing device associated with an learner of the online course. The authoring tool is configured to add material to the education content. The authoring tool is configured to provide at least one user interface for creation of a learner-created question for an assessment for the online course. The online education platform is configured to convert the learner-created question from a first format to a second format compatible to the online education platform, store the learner-created question in an assessment bank, where the assessment bank includes learner-created questions and instructor-created questions, and select a plurality of questions from the assessment bank for the assessment for the online course.

According to some implementations, the online education platform may include the following one or more features (or any combination thereof). The learner-created question may be stored in a one-question format. The online education platform may sort the learner-created questions and the instructor-created questions in the assessment back according to quality, and select the plurality of questions based on the sorted list. The at least one user interface provided by the authoring tool may identify at least one text box for describing the learner-created question and one or more text boxes for providing one or more answers to the learner-created question. The online education platform may provide an authoring tool on a computing device associated with an instructor of the online course, where the authoring tool provides at least one user interface for development of an instructor-related question, convert the instructor-related question from the first format to the second format compatible to the online education platform, and store the instructor-related question in the assessment bank. The first format may be a hypertext markup language (HTML) format, and the second format may be an education markup language (EML) format. The EML format may define a plurality of blocks using extensible markup language (XML), where each of the plurality of blocks corresponds to a different type of data content. The XML may define each block of the plurality of blocks with restricted attributes that limits a block to a particular type of data content.

According to an implementation, a method for implementing an online education platform that provides an online course over a network to a plurality of computing devices in which learners view and interact with education content of the online course includes providing an authoring tool on a computing device associated with an learner of the online course, where the authoring tool can add material to the education content and provide at least one user interface for creation of a learner-created question for an assessment for the online course, converting the learner-created question from a first format to a second format compatible to the online education platform, storing the learner-created question in an assessment bank, where the assessment bank includes learner-created questions and instructor-created questions, and selecting a plurality of questions from the assessment bank for the assessment for the online course.

According to some implementations, the method may include the following one or more features (or any combination thereof). The learner-created question may be stored in a one-question format. The method may further including sorting the learner-created questions and the instructor-created questions in the assessment back according to quality, and selecting the plurality of questions based on the sorted list.

The details of one or more implementations are set forth in the accompanying drawings and the description below. Other features will be apparent from the description and drawings, and from the claims.

BRIEF DESCRIPTION OF THE DRAWINGS

FIG. 3A illustrates a screenshot of an assessment question on the learner application according to an implementation.

FIG. 3B illustrates a screenshot of an assessment question on the learner application according to another implementation.

FIG. 3C illustrates a screenshot of performance results of an online course according to an implementation.

DETAILED DESCRIPTION

The embodiments provide an online education platform that creates and updates an assessment bank having both learner-created content and instructor-created content relating to an online course. For example, an instructor using an instructor application can create questions that quiz the learners about the various subjects of the online course, and these questions can be converted into a format that is compatible with the format of the online education platform, and stored within the assessment bank. Also, after consuming the education content of the online course via a learner application, a learner may use the learner application to create their own training/assessment questions (subject to the instructor's approval), and these questions can be converted into the format of the online education platform. These learner-created questions may be combined with the instructor-created questions within the assessment bank. From this pool of questions, the online education platform may select different combinations of questions from the assessment bank to be presented to the learners to practice the material. Then, based on the performance data and/or survey results, the online education platform may determine that some of the questions are better than others. As learners provide more or more learner-created questions, the quality of the content within the assessment bank may increase over time. In some examples, the learners can also be prompted to practice these questions (selected from the pool of questions) if they are struggling in the course. Also, the questions from the pool of questions may be intelligently selected to tie to specific skills that the learners can gain as they answer more questions correctly.

Figure 1:
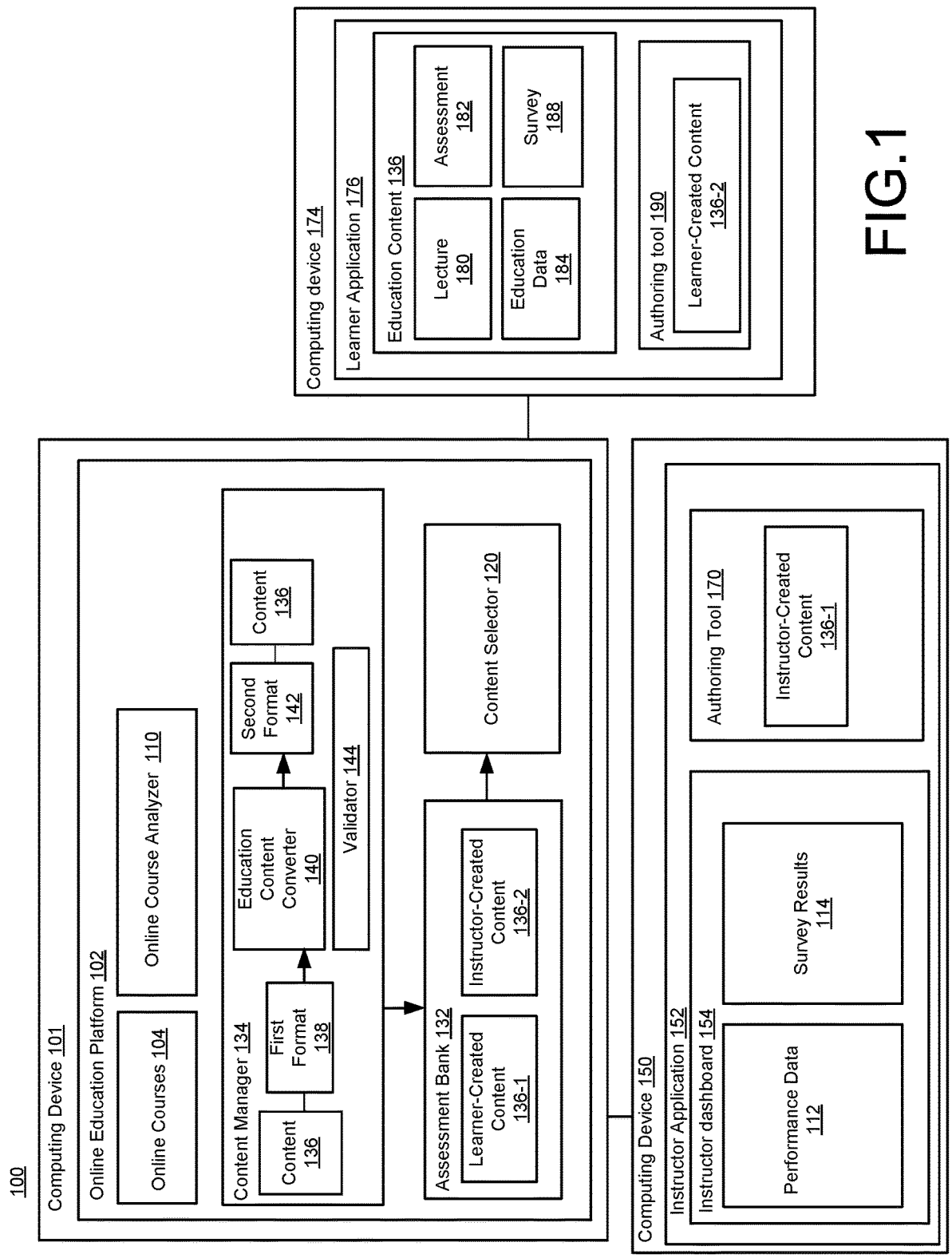
FIG. 1 is a schematic diagram of a system configured to support an online education platform that includes an assessment bank having learner-created content and instructor-created content according to an implementation.

FIG. 1 is a schematic diagram of a system 100 configured to support an online education platform 102 according to an implementation. The system 100 includes a computing device 101 configured to host the online education platform 102. The online education platform 102 may be configured to provide, over a network, online courses 104 to learners (students) via their computing devices 174. Referring to FIG. 1, the computing device 174 refers to a device used by a learner of an online course 104, and the learner uses his/her computing device 174 to connect to the online education platform 102 and receive education content 136 corresponding to the online course 104 from the online education platform 102. For instance, the online course 104 may specify the education content 136 that is delivered over the network to a learner application 176 of the computing device 174 in which a learner can view and interact with the education content 136.

The education content 136 may include a variety of information such as a lecture 180, an assessment 182 (e.g., quiz, test, assignment, etc.), education data 184 (e.g., text, audio, images, tables, math expressions, graphs, etc. for learning), and a survey 188. The lecture 180 may include one or more video and/or audio clips that correspond to a particular online course 104 (or a portion, module, or segment thereof). The online course 104 may specify a number of various lectures 180 that are viewed by the learners at different points in the timeline of the online course 104. The lecture 180 may define one or more user controls that allow the learner to control the lecture 180 and provide feedback to the online education platform 102. The assessment 182 may include one or more interactive questions to be answered by the learner via his/her computing device 174. In some examples, the assessment 182 may include a series of questions that are presented one question at a time. For example, the learner application 176 may provide a user interface that depicts only one question, and the learner submit his/her answer before moving on to the next question in the series of questions. In this manner, the learner can practice the material of the online course 104. Also, the online education platform 102 can store the grade for each attempt of a question, and can tie a question to a skill or module in the online course 104. The education data 184 may include any type of visual information that is presented to the learner as part of the online course 104. For instance, the education data 184 may include one or more images, captions to the lecture, graphs, text, audio, or any other type of data that is presented to the learners, as well as interactive controls that permits the learners to comment and provide feedback regarding the education content 136. The survey 188 may include one or more survey questions that elicit feedback about the online course 104 from the learners. For example, the survey 188 may ask the learner to rate on a scale of 1 to 5 various topics relating to the online course 104. The survey 188 may be presented towards the end of the course, or may survey the learners at other parts of the online course 104 such as after completing an assessment 182 or watching/listening to a lecture 180.

The online education platform 102 may partner with universities, schools, and/or organizations to provide the online courses 104. In some examples, the online education platform 102 may provide hundreds or thousands of online courses 104 across many different types of universities, schools, or organizations, and each online course 104 may have hundreds of learners (e.g., hundreds of computing devices 174 connecting to a particular online course 104 via the online education platform 102). The online courses 104 may enable learners to watch short lectures, take interactive quizzes and peer-graded assessments, and connect with other learners and instructors. The online courses 104 may include session-based online courses and on-demand courses. The session-based online courses may be associated with a course schedule, and have specific start and end dates. Tests, if any, are taken according to the course schedule. The on-demand courses are courses in which learners take on their own time, and guided by instructors to meet individual needs.

The online education platform 102 allows many learners to take a single online course 104, and, as a result, provides a level of statistical data that was not possible with conventional courses or with online education platforms having a smaller capacity. For instance, in a typically class, the number of learners may be around 30. However, with respect to a particular online course 104 provided by the online education platform 102, the number of learners may be over one hundred learners. In other examples, the number of learners for a single online course 104 may be over 300. As such, the large number of learners for a particular class permits the online education platform 102 to make certain types of classifications and analysis that was not possible with conventional courses or smaller online platforms, as further explained below.

The online education platform 102 may include an online course analyzer 110 configured to provide, over the network, performance data 112 and/or survey results 114. The online course analyzer 110 may provide the performance data 112 and/or the survey results 114 to the instructors and/or learners. In one example, while the learner is practicing the education content 136, the online course analyzer 110 may provide the results of the assessment 182 (e.g., which questions the learner got right/wrong, the percentage of right/wrong answers) according to a certain time period (e.g., by week) or by learning objectives.

In some examples, the online course analyzer 110 may provide the performance data 112 and/or survey results 114 via an instructor dashboard 154 of an instructor application 152 of a computing device 150. The instructor dashboard 154 may display performance data 112 regarding the learner's interaction and/or performance with the education content 136, as well as any survey results 114. For instance, the instructor dashboard 154 may provide the instructor with the most relevant and interesting data regarding the online class's performance so that the instructor can make determinations on how well the learners are understanding the education content 136, and determine whether his/her online course 104 could benefit from any adjustments. The online course analyzer 110 may be configured to analyze the learners' performance and feedback with respect to the education content 136, and provide statistical analysis on multiple different levels such as analyzing the quality of an assessment 182, comparing different versions of assessments 182, evaluating parts of the online course 104 having low/high engagements, analyzing overall performance of the learners, and/or marking characterizations about different groups of people, etc. In some examples, the instructor dashboard 154 may be a user interface (or series of user interfaces) that render the performance data 112 and the survey results 114.

The computing device 150 refers to a device used by an instructor of an online course 104, and the instructor uses his/her computing device 150 to connect to the online education platform 102 to view the learners' performance and engagement via the instructor dashboard 154 and can make adjustments to the education content 136 via an authoring tool 170 that interacts with a content manager 134 which makes any instructor edits compatible with a format of the online education platform 102 such that the re-published education content 136 (reflecting the changed material) can be rendered across any implementation of the learner application 176 (e.g., native mobile, web, mobile web).

The instructor may develop or modify the assessment 182 by adding, deleting, or changing the content for the questions and answers of the assessment 182 using the authoring tool 170. In some examples, the instructor may see that a low percentage of learners correctly answer a question from the assessment 182. Then, while viewing this performance data 112, the instructor may start a process of altering the education content 136 (e.g., adding a new question, or rewording an existing question from the assessment 182). In some examples, the authoring tool 170 may be integrated into the instructor dashboard 154 in a manner that allows the instructor to start an edit of an assessment 182 or change other parts of the education content 136 while viewing the performance data 112 (or other types of feedback) provided via the instructor dashboard 154. In other words, the instructor may not need to log into a separate system or navigate a different part of the online education platform 102. Rather, the instructor may activate a link, tab, control, button, etc. on the same user interface that provides the performance data 112 and/or the survey results 114, and this activation causes the online education platform 102 to provide a user interface (or series of user interfaces) that a part of the authoring tool 170, which allows the instructor to change (add, delete, or modify) various parts of the education content 136 including any quiz material.

The learner application 176 also defines an authoring tool 190 that permits a learner to add material to the education content 136. The authoring tool 190 may operate in a similar manner as the authoring tool 190.

The online education platform 102 may create and update an assessment bank 132 having both learner-created content 136-1 and instructor-created content 136-2 relating to an online course 104. In some examples, the learner-created content 136-1 may include one or more assessment or training questions that are created by the learners themselves. In some examples, the instructor-created content 136-2 may include one or more assessment or training questions that are created by the instructors. For example, an instructor using the authoring tool 170 can create questions that quiz the learners about the various subjects of the online course 104, and these questions can be converted into a format that is compatible with the format of the online education platform 102. Also, after consuming the education content 136 of the online course 104 via the learner application 176, a learner may use the authoring tool 190 to create their own training/assessment questions (subject to the instructor's approval), and these questions can be converted into the format of the online education platform 102. These learner-created questions may be combined with the instructor-created questions within the assessment bank 132. In some examples, each of the instructor-created questions and the learner-created questions are stored in a one-question format such that any of the questions can be selected and combined together to form an assessment 182.

From this pool of questions, a content selector 120 of the online education platform 102 may select different combinations of questions from the assessment bank 132 to be presented to the learners to practice the material. In some examples, the content selector 120 may randomly select a subset of questions to be included part of an assessment 182 related to a particular subject matter that the learner is currently learning. Then, based on the performance data 112 and/or survey results 114, the online education platform 102 may determine that some of the questions are better than others. As learners provide more or more learner-created questions, the quality of the content within the assessment bank 132 may increase over time. In some examples, the online education platform 102 may receive feedback from learners who have taken the assessment 182. For example, a learner might provide feedback that a particular question was not teaching a specific skill or that the question was not helpful. This feedback may be used to identify bad questions. As the online education platform 102 receives feedback from more and more learners, the content selector 120 may sort the questions from the assessment bank 132 by quality. Having a larger assessment bank 132 may also indicate more practice, which can be a better experience for learners to master their skills.

Figure 3D:
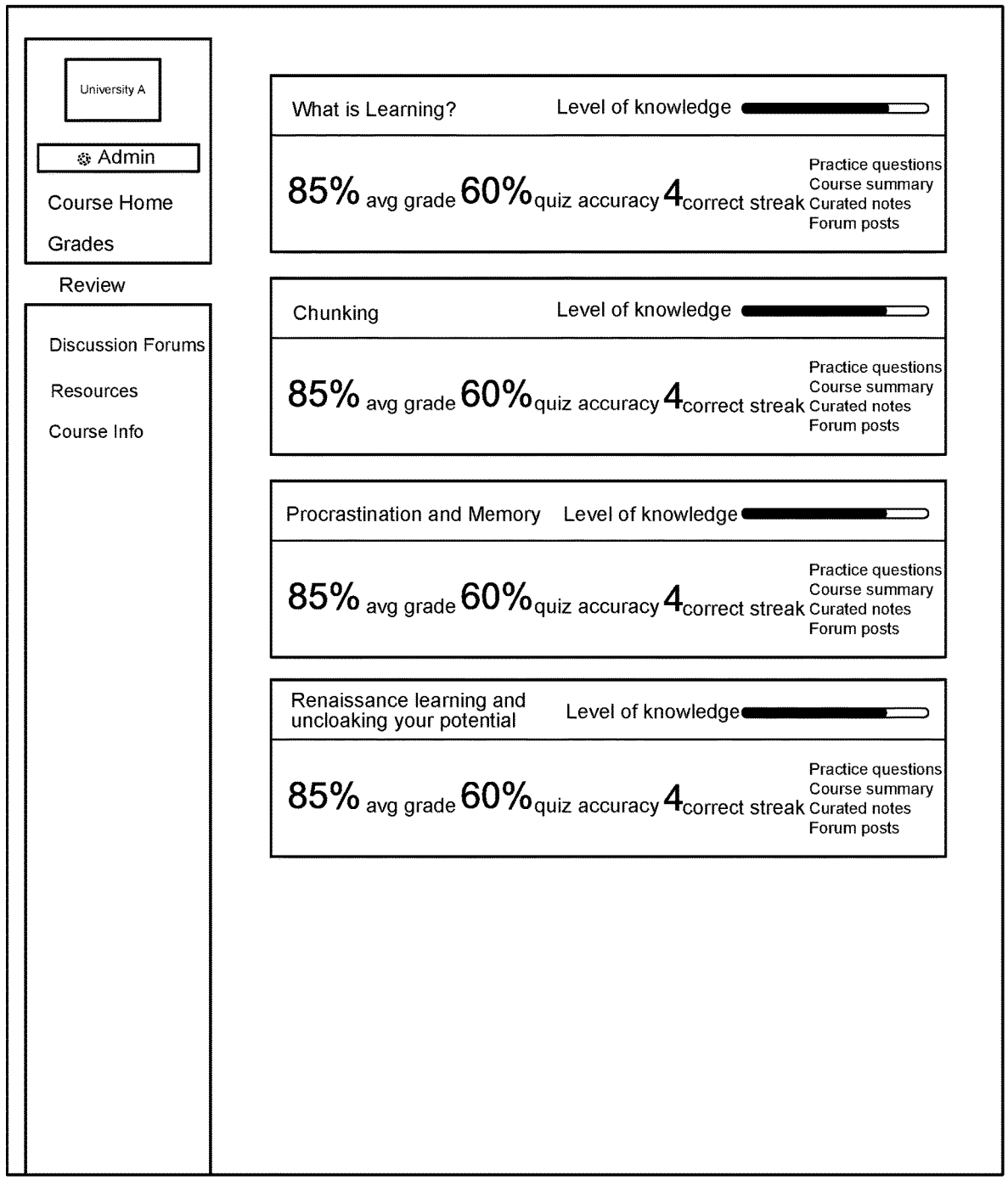
FIG. 3D illustrates a screenshot of performance results of an online course according to another implementation.

FIGS. 3A-3D illustrate various screenshots of an assessment 182 taken by learners, which presents questions selected from the assessment bank 132. FIG. 3A illustrates a screenshot 300 of an assessment question on the learner application 176 according to an implementation. For example, the learner can practice the course material by answering a series of questions (e.g., questions 1-10), and the user interface presents one question at a time for the learner. FIG. 3B illustrates a screenshot 305 of an assessment question on the learner application 176 according to another implementation. On FIG. 3B, the leaner provided a selection to the third question, which the online education platform 102 provides immediate feedback so that the learner can further learn the material as they complete each assessment question. FIG. 3C illustrates a screenshot 310 of performance data 112 of an online course 104 according to an implementation, and FIG. 3D illustrates a screenshot 315 of performance data 112 of an online course 104 according to another implementation. For example, the online course analyzer 110 may compute the performance data 112 for the assessment 182, and can provide this information back to the learner so that the learner can see how well he/she understands the course material.

Referring back to FIG. 1, the content manager 134 may interface with the authoring tool 170/190 to edit or develop the education content 136. The authoring tool 170/190 may define a user interface (or series of user interfaces) that allows the instructors/learners to edit the education content 136 including adding questions to the assessment bank 132 for the training exercises (like shown in FIGS. 3A-3D). In some examples, the user interface of the authoring tool 170/190 may identify one or more text boxes for describing the question and one or more text boxes for providing possible answers (e.g., multiple choice questions). The learner/instructor may create or edit a question by typing text with or without a limited set of stylized features (e.g., underlying, bolding, strike-through, etc.), and inserting and/or defining math expressions, headers, images, videos, audio files, tables, lists, hyperlinks, and/or code blocks. In some examples, the text boxes of the user interface of the authorizing tool 170/190 may provide a tool bar that lists a plurality of tools such as inserting tables, inserting math expressions, inserting a header, underline, strike-through, and/or bold, etc.

The content manager 134 may receive the learner-created content 136-1 and/or the instructor-created content 136-2 in a first format 138. The first format 138 may be a textual format specifying text (letters, numbers, and/or symbols without or within stylized features), math expressions, images, videos, audio files, tables, lists, hyperlinks, and/or code blocks or HTML. In some examples, the first format 138 is the HTML format.

The content manager 134 may include an education content converter 140 configured to convert the content 136-1 or 136-2 having the first format 138 to content 136-1 or 136-2 having a second format 142. In some examples, the second format 142 is considered a special education markup language that can operate with the end client to render education content (especially quizzes) with relatively good quality. For instance, on some platforms (e.g., mobile web), standard HTML tags do not render well when rendering special types of data such as the assessments 182. However, the content 136-1 or 136-2 with the second format 142 is rendered with good design quality and uniform look and feel regardless of the type of end client or platform (e.g., across mobile web, native mobile application, or standard HTML web). Because the content manager 134 converts from the first format 138 to the second format 142, the instructor/learner is unburdened with having to know the layout (or presentation details) of a particular platform (rather the layout is handled by the end client), and, therefore, the instructor/learner can focus on the meaning of the content. For instance, the instructor/learner can create assessment questions for storage in the assessment bank 132 using the text editor without having to know the details of HTML or whether certain data can cause security concerns. Also, the use of the second format 142 improves the functioning of the online education platform 102 itself because it improves the functioning and/or speed of populating changes within the online education platform 102. Furthermore, it lessens the security concerns associated with having many instructors/learners insert content into the online education platform 102 by restricting the types of content that can be manipulated by the instructors/learners.

In some examples, the second format 142 is a restricted XML format. For example, the restricted XML format may define the types of content permitted on the online education platform 102. In some examples, the restricted XML format may define a number of content types less than what is traditionally provided with XML or HTML. In other examples, the second format 142 is a restricted HTML format. In some examples, the restricted HTML format may define a number of HTML tags that are less than what is traditionally provided by HTML. In some examples, the restricted XML or HTML format is defined in terms of blocks, where each block relates to a different type of content (e.g., text block, table block, audio block, list block, etc.). Also, each block is associated with a limited set of attributes. Stated another way, the XML or HTML tags are defined with a limited set of attributes. In one example, the text block may specify text in terms of letters, numbers, and systems, and may include math expressions with a limited set of stylized features such as underlined, strikethrough, bold, etc. However, with respect to the text block, other features may be excluded such as double strikethrough.

The content manager 134 may include a validator 144 configured to validate that the content 136-1 or 136-2 is suitable for conversion by the education content converter 140. In some examples, the validator 144 may perform a formality check on the content 136-1 or 136-2 such that the content 136-1 or 136-2 has the appropriate language to be converted. For instance, the authoring tool 170/190 may specify the insertion of a math expression using certain attributes, and, if the wrong attributes are used, the validator 144 may notify the instructor/leaner to use the correct the attributes. After the content 136-1 or 136-2 is validated and converted, the updated education content 136 may be stored in the assessment bank 132.

The learner application 176 may be configured to communicate with the online education platform 102 over the network, and render and interact with the education content 136 provided by the online course 104. The learner application 176 may be a native application (including native mobile) or a browser-based application (mobile browser, or non-mobile browser) executing on an operating system of the computing device 174. The browser-based application may be referred to as mobile web or web. The learner application 176 may provide the education content 136 via an interface allows a learner to interact with the online education platform 102. The computing device 174 may be a mobile computing device (e.g., a smart phone, a PDA, a tablet, or a laptop computer) or a non-mobile computing device (e.g., a desktop computing device). The computing device 174 also includes various network interface circuitry, such as for example, a mobile network interface through which the computing device 174 can communicate with a cellular network, a Wi-Fi network interface with which the computing device 174 can communicate with a Wi-Fi base station, a Bluetooth network interface with which the computing device 174 can communicate with other Bluetooth devices, and/or an Ethernet connection or other wired connection that enables the computing device 174 to access the network.

The instructor application 152 may be configured to communicate with the online education platform 102 over the network. In some examples, the instructor application 152 is different than the learner application 176. In other examples, the instructor application 152 is the same or substantially the same as the learner application 176 except that the instructor application 152 includes additional functionality associated with instructors (e.g., providing an instructor dashboard 154 integrated with the authoring tool 170). For instance, a user may log into the online education platform 102, and if the user has been identified as an instructor, the online education platform 102 may provide the functionalities described with respect to the computing device 150. On the other hand, if the user has been identified as a learner, the online education platform 102 may provide the functionalities described with respect to the computing device 174. The instructor application 152 may render the instructor dashboard 154 and the integrated authoring tool 170. The instructor application 152 may be a native application or a browser-based application executing on an operating system of the computing device 150.

The computing device 150 may be a mobile computing device (e.g., a smart phone, a PDA, a tablet, or a laptop computer) or a non-mobile computing device (e.g., a desktop computing device). The computing device 150 also includes various network interface circuitry, such as for example, a mobile network interface through which the computing device 150 can communicate with a cellular network, a Wi-Fi network interface with which the computing device 150 can communicate with a Wi-Fi base station, a Bluetooth network interface with which the computing device 150 can communicate with other Bluetooth devices, and/or an Ethernet connection or other wired connection that enables the computing device 150 to access the network.

In some examples, the online education platform 102 may be considered a cloud-based online education service such that all or most of its main functionalities are executed on the computing device 101. For instance, the computing device 174 or the computing device 150 may access the online education platform 102 via the network through the use of any type of network connections and/or application programming interfaces (APIs) in a manner that permits the online education platform 102, the learner application 176, and the instructor application 152 to communicate with each other. In this regard, the term "cloud" or "cloud-aware" references the use of "cloud computing," which, generally speaking, includes a style of computing in which computing resources such as application programs and file storage are remotely provided over the network such as the Internet, typically through a web browser. For example, many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the computing device 101 may also represent an example of cloud computing. In other examples, a portion of the features of the online education platform 102 may be incorporated into the learner application 176 or the instructor application 152 executing locally on the computing device 174 or the computing device 150.

In some examples, the computing device 101 may include one or more servers. In some examples, the computing device 101 may include one or more processors (e.g., a processor coupled to a substrate), and a non-transitory computer-readable medium including executable instructions that when executed by the one or more processors are configured to implement the functionalities of the online education platform 102.

Figure 2:
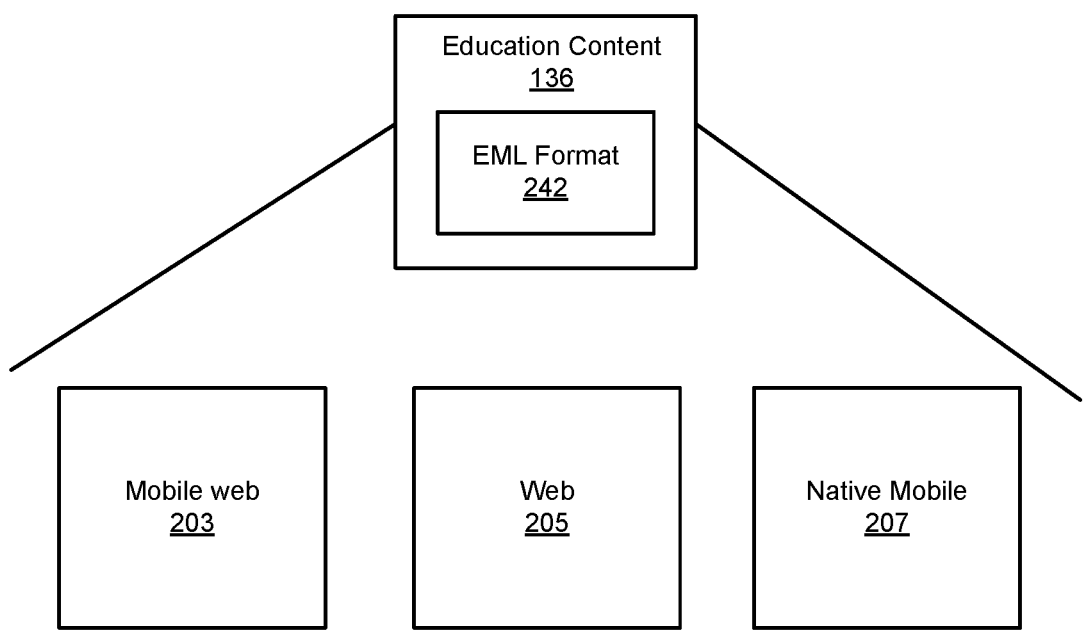
FIG. 2 illustrates education content that is operable across multiple implementations of a learner application of the system of FIG. 1 according to an implementation.

FIG. 2 illustrates the education content 136 that is operable across multiple platforms of the learner application 176 according to an implementation. In some examples, the second format 142 is an education markup language (EML) format 242. The education content 136 having the EML format 242 is capable of being rendered across the learner application 176 implemented as a mobile web 203, a web 205, or native mobile 207. The mobile web 203 refers to access to the online education platform 102 through the use of a browser on a mobile phone (e.g., mobile browser) that display the education content 136 as a webpage. The web 205 refers to access to the online education platform 102 through the use of a non-mobile browser that displays the education content 136 as a webpage. The native mobile 207 may refer to a native application installed on a mobile. Typically, the education content 136 created by the instructors is either plain text or HTML (e.g., the education content 136 in the first format 138). However, the HTML tags for the assessments 182 do not render well (or properly) on the mobile web 203. For instance, with respect to certain types of data like the assessments 182 and other types of education data 184, presentation quality may be less than optimal on certain types of clients (e.g., mobile web 203) if there were no such conversion to the EML format 242. Therefore, according to the embodiments, the education content converter 140 converts the education content 136 having the first format 138 (e.g., the HTML) to education content 136 having the EML format 242.

Figure 4:
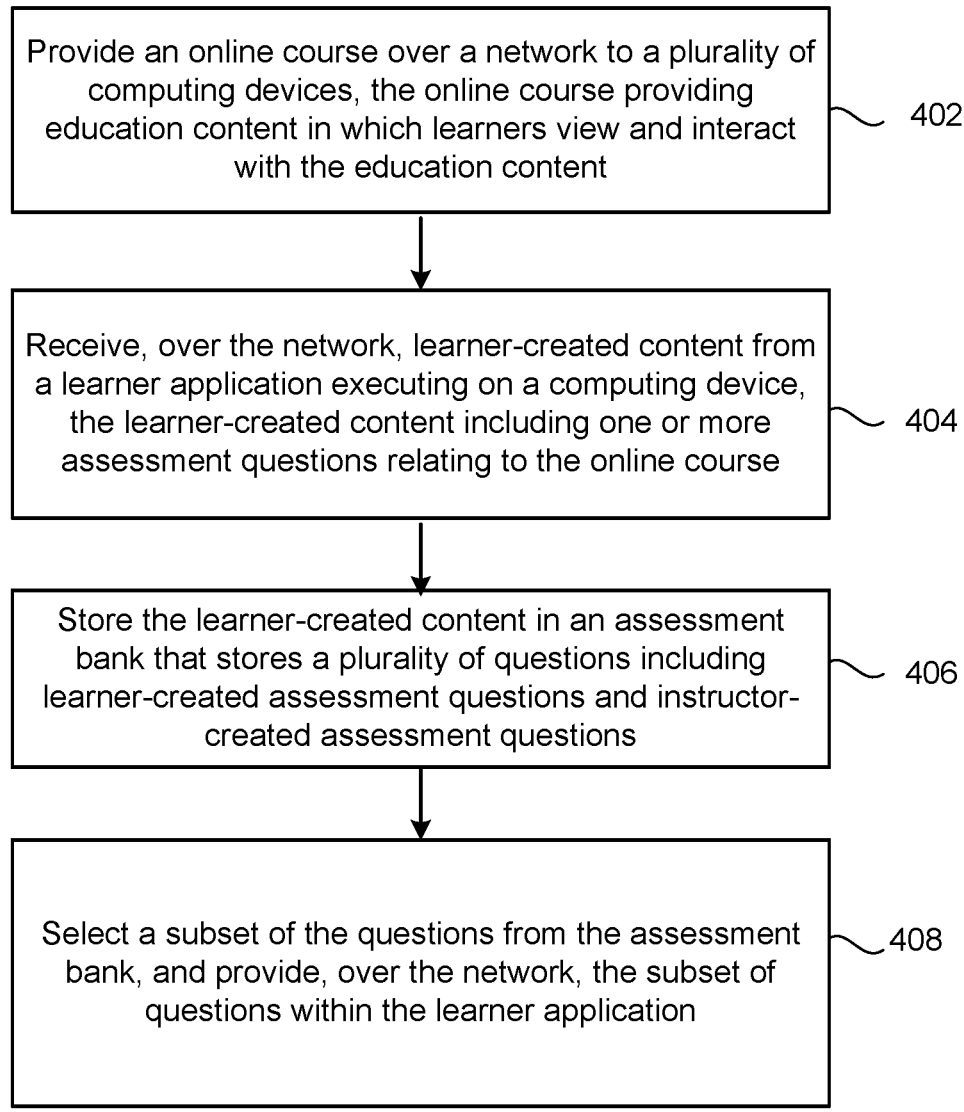
FIG. 4 illustrates a flowchart depicting example operations of the system of FIG. 1 according to another implementation.

FIG. 4 illustrates a flowchart 400 depicting example operations of the system 100 of FIG. 1 according to an implementation. Although FIG. 4 is illustrated as a sequential, ordered listing of operations, it will be appreciated that some or all of the operations may occur in a different order, or in parallel, or iteratively, or may overlap in time.

An online course may be provided over a network to a plurality of computing devices, the online course providing education content in which learners view and interact with the education content (402). For example, the online education platform 102 may provide an online course 104 over a network to a plurality of computing devices 174, where the online course 104 includes education content 136 (e.g., learner-created content 136-1 and/or instructor-created content 136-2) in which learners view and interact with the education content 136.

Learner-created content may be received over a network from a leaner application executing on one of the computing devices, the learner-created content including one or more assessment questions relating to the online course (404). For example, the online education platform 102 may receive learner-created content 136-1 over the network from the learner application 176 executing on the computing device 174. A learner may use the authoring tool 190 to create one or more learner-created assessment questions for storage within the assessment bank 132. In some examples, upon receiving the learner-created content 136-1, the content manager 134 may convert the learner-created content 136-1 from the first format 138 to the second format 142, as described above.

The learner-created content may be stored in an assessment bank that stores a plurality of questions including learner-created assessment questions and instructor-created assessment questions (406). The online education platform 102 may store the learner-created content 136-1 in the assessment bank 132. The assessment bank 132 may store a plurality of questions (within a one-question at a time format), and these questions may include learner-created questions and instructor-created questions.

A subset of the questions from the assessment bank may be selected, and the subset of the questions may be provided over the network to the learner application (408). For example, the content selector 120 may select a subset of the questions for the assessment bank, and provide these questions over the network to the learner application 176 so that the learner can practice the online course material.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
    at least one processor;
    a non-transitory computer-readable medium configured to store executable instructions that when executed by the at least one processor are configured to implement an online education platform configured to provide an online course over a network to a plurality of computing devices, the online course providing education content in which learners view and interact with the education content, the online education platform including:
    a content manager configured to provide an authoring tool on a computing device associated with an learner of the online course, the authoring tool configured to add material to the education content, the authoring tool configured to provide at least one user interface for creation of a learner-created question for an assessment for the online course,
    wherein the content manager includes an education content converter configured to receive the learner-created question in a first format and convert the first format to a second format compatible to the online education platform,
    the second format including a restrictive extensible markup language (XML) defining a set of restrictive XML tags, the second format defining a plurality of blocks, each of the plurality of blocks corresponding to a different type of data content with restricted attributes that limit a block to a particular type of data content such that one or more features are not allowed, the second format configured to enable native rendering of the education content in a web application, a mobile web application, and a native mobile application regardless of the respective computing device type;
    an assessment bank configured to store the learner-created question, the assessment bank including learner-created questions and instructor-created questions; and
    a content selector configured to select a plurality of questions from the assessment bank for the assessment for the online course.

2. The system of claim 1, wherein the learner-created question is stored in a one-question format.

3. The system of claim 1, wherein the content selector is configured to sort the learner-created questions and the instructor-created questions in the assessment back according to quality, and select the plurality of questions based on the sorted list.

4. The system of claim 1, wherein the at least one user interface provided by the authoring tool identifies at least one text box for describing the learner-created question and one or more text boxes for providing one or more answers to the learner-created question.

5. The system of claim 1, wherein the first format is a hypertext markup language (HTML) format.

6. The system of claim 1, wherein the online education platform includes:
    an online course analyzer configured to compute performance data for the assessment, wherein the content selector is configured to determine a quality of one or more of the plurality of questions based on the performance data and re-select questions for the assessment based on the performance data.

7. A non-transitory computer-readable medium storing executable instructions that when executed by at least one processor are configured to implement an online education platform, the online education platform configured to provide an online course over a network to a plurality of computing devices, the online course providing education content in which learners view and interact with the education content, the online education platform configured to:
    provide an authoring tool on a computing device associated with a learner of the online course, the authoring tool configured to add material to the education content, the authoring tool configured to provide at least one user interface for creation of a learner-created question for an assessment for the online course;
    convert the learner-created question from a first format to a second format compatible to the online education platform, the second format including a restrictive extensible markup language (XML) defining a set of restrictive XML tags, the second format defining a plurality of blocks, each of the plurality of blocks corresponding to a different type of data content with restricted attributes that limit a block to a particular type of data content such that one or more features are not allowed, the second format configured to enable native rendering of the education content in a web application, a mobile web application, and a native mobile application regardless of the respective computing device type;
    store the learner-created question in an assessment bank, the assessment bank including learner-created questions and instructor-created questions; and
    select a plurality of questions from the assessment bank for the assessment for the online course.

8. The non-transitory computer-readable medium of claim 7, wherein the learner-created question is stored in a one-question format.

9. The non-transitory computer-readable medium of claim 7, further comprising:
    sort the learner-created questions and the instructor-created questions in the assessment back according to quality; and
    select the plurality of questions based on the sorted list.

10. The non-transitory computer-readable medium of claim 7, wherein the at least one user interface provided by the authoring tool identifies at least one text box for describing the learner-created question and one or more text boxes for providing one or more answers to the learner-created question.

11. The non-transitory computer-readable medium of claim 7, further comprising:
provide an authoring tool on a computing device associated with an instructor of the online course, the authoring tool configured to provide at least one user interface for development of an instructor-related question,
convert the instructor-related question from the first format to the second format compatible to the online education platform; and
store the instructor-related question in the assessment bank.

12. The non-transitory computer-readable medium of claim 7, wherein the first format is a hypertext markup language (HTML) format.

13. The non-transitory computer-readable medium of claim 7, further comprising:
compute performance data for the assessment;
determine a quality of one or more of the plurality of questions based on the performance data; and
re-select questions for the assessment based on the performance data.

14. A method for implementing an online education platform that provides an online course over a network to a plurality of computing devices in which learners view and interact with education content of the online course, the method comprising:
providing an authoring tool on a computing device associated with an learner of the online course, the authoring tool configured to add material to the education content, the authoring tool configured to provide at least one user interface for creation of a learner-created question for an assessment for the online course;
converting the learner-created question from a first format to a second format compatible to the online education platform, the second format including a restrictive extensible markup language (XML) defining a set of restrictive XML tags, the second format defining a plurality of blocks, each of the plurality of blocks corresponding to a different type of data content with restricted attributes that limit a block to a particular type of data content such that one or more features are not allowed, the second format configured to enable native rendering of the education content in a web application, a mobile web application, and a native mobile application regardless of the respective computing device type;
storing the learner-created question in an assessment bank, the assessment bank including learner-created questions and instructor-created questions; and
selecting a plurality of questions from the assessment bank for the assessment for the online course.

15. The method of claim 14, wherein the learner-created question is stored in a one-question format.

16. The method of claim 14, further comprising:
sorting the learner-created questions and the instructor-created questions in the assessment back according to quality; and
selecting the plurality of questions based on the sorted list.

17. The method of claim 14, further comprising:
computing performance data for the assessment;
determining a quality of one or more of the plurality of questions based on the performance data; and
re-selecting questions for the assessment based on the performance data.

* * * * *